(12) United States Patent
Scurtu et al.

(10) Patent No.: US 9,641,880 B1
(45) Date of Patent: May 2, 2017

(54) AUTOMATICALLY IDENTIFYING REDUCED AVAILABILITY OF MULTI-CHANNEL MEDIA DISTRIBUTORS FOR AUTHENTICATION OR AUTHORIZATION

(71) Applicant: Adobe Systems Incorporated, San Jose, CA (US)

(72) Inventors: Tudor Scurtu, Jud. Neamt (RO); Robert Mares, Bucharest (RO); George Horia Galatanu, Lafayette, CA (US); Alexandru Popa, Arges (RO)

(73) Assignee: Adobe Systems Incorporated, San Jose, CA (US)

( * ) Notice: Subject to any disclaimer, the term of this patent is extended or adjusted under 35 U.S.C. 154(b) by 0 days.

(21) Appl. No.: 15/070,025

(22) Filed: Mar. 15, 2016

(51) Int. Cl.
| | |
|---|---|
| H04N 7/16 | (2011.01) |
| H04N 21/254 | (2011.01) |
| H04L 29/06 | (2006.01) |
| H04N 21/438 | (2011.01) |
| H04N 21/266 | (2011.01) |
| H04N 21/485 | (2011.01) |

(Continued)

(52) U.S. Cl.
CPC .......... *H04N 21/254* (2013.01); *H04L 63/08* (2013.01); *H04L 63/108* (2013.01); *H04N 21/2402* (2013.01); *H04N 21/266* (2013.01); *H04N 21/4384* (2013.01); *H04N 21/485* (2013.01); *G06F 21/10* (2013.01); *H04L 63/1408* (2013.01); *H04N 21/24* (2013.01); *H04N 21/2404* (2013.01); *H04N 21/2541* (2013.01)

(58) Field of Classification Search
CPC . H04L 29/08666; H04L 63/08; H04L 63/108; H04L 63/1408; H04N 21/24; H04N 21/2404; H04N 21/2541; G06F 21/10
See application file for complete search history.

(56) References Cited

U.S. PATENT DOCUMENTS

| | | | |
|---|---|---|---|
| 6,856,800 B1 * | 2/2005 | Henry ................... | H04W 12/06 380/247 |
| 2007/0209081 A1 * | 9/2007 | Morris ............... | H04N 7/17318 726/29 |

(Continued)

*Primary Examiner* — James R Marandi
(74) *Attorney, Agent, or Firm* — Kilpatrick Townsend & Stockton LLP

(57) ABSTRACT

Embodiments are provided for automatically identifying reduced availability of multi-channel media distributors for authentication or authorization. For example, an entitlement service communicates with a multi-channel media distributor to authenticate viewers requesting content from programmers or to confirm that authenticated viewers are authorized to receive content from the programmers. The entitlement service receives requests for various programmers to provide media content to user devices, and transmits the requests to the multi-channel media distributor. The entitlement service determines a reduced availability of the multi-channel media distributor based on, for example, an unusually low success rate for authenticating users or authorizing the users' access to content access based on the transmitted requests. Due to this reduced availability of the multi-channel media distributor, the entitlement service provides the requesting user devices with temporary access to the media content from the programmers during a period in which the reduced availability occurs.

20 Claims, 9 Drawing Sheets

(51) Int. Cl.
*H04N 21/24* (2011.01)
*G06F 21/10* (2013.01)

(56) References Cited

U.S. PATENT DOCUMENTS

2010/0192212 A1* 7/2010 Raleigh ............ G06Q 10/06375
  726/7
2011/0321132 A1* 12/2011 Slingerland ........ H04N 21/4788
  726/4

* cited by examiner

AUTOMATICALLY IDENTIFYING REDUCED AVAILABILITY OF MULTI-CHANNEL MEDIA DISTRIBUTORS FOR AUTHENTICATION OR AUTHORIZATION

CROSS-REFERENCE TO RELATED APPLICATIONS

This application is related to concurrently-filed U.S. patent application Ser. No. 15/070,053, entitled "Automatically Determining Restored Availability of Multi-Channel Media Distributors for Authentication or Authorization," which is incorporated by reference herein in its entirety.

TECHNICAL FIELD

This disclosure relates generally to computer-implemented methods and systems and more particularly relates to automatically identifying reduced availability of multi-channel media distributors for authentication or authorization.

BACKGROUND

A multi-channel media distributor, such as a cable company or other multi-channel video programming distributor, provides media content for multiple television channels or other media channels to subscribers over dedicated networks. The individual media content offered to subscribers is typically provided by numerous, different programmers or other content providers. For example, a typical multi-channel media distributor offers 100 or more television channels from 50 or more different programmers and delivers the television content for all of those channels through cable or telephone wires to the homes of its subscribers.

As use of the Internet and mobile computing devices has grown, viewers have begun to seek programmer video channels through the Internet, on mobile phones, and by directly looking for media programmer provided content outside of the dedicated multi-channel media distributor networks. For example, a given viewer will have a subscription with a cable television company, multi-channel media distributor A, and be able to watch a local football game on his home television on channel B, which is provided by media programmer B.

Existing systems allow the viewer to also watch the football game and other channel content even when the viewer is not at home (and thus cannot access the multi-channel media distributor dedicated network) or when the viewer uses a mobile device rather than a television to view media content from one or more channel. In these systems, a multi-channel media distributor acts as an identity provider for end users by authenticating users on behalf of programmers, verifying that authenticated users are authorized to access certain content provided by programmers, or both. In an authentication operation, the multi-channel media distributor verifies that a user has presented valid credentials for a given programmer in response to the user's computing device attempting to view or otherwise access an online resource (e.g., a TV channel) on the programmer's web site. In an authorization operation, the multi-channel media distributor verifies that the authenticated credentials are entitled to access a particular resource provided by the programmer. For example, a viewer accesses a website or mobile device app provided by media programmer B, and programmer B provides the video directly to the viewer through the Internet after authenticating the viewer and confirming that the viewer's access to the video is consistent with the viewer's subscription to the multi-channel media distributor. Specifically, programmer B provides the video based on checking with the multi-channel media distributor to authenticate the viewer's subscription, to confirm that the viewer is authorized to receive the particular video content (e.g., the football game), or both.

Existing systems involving multi-channel media distributors and programmers may not adequately respond when problems arise with the multi-channel media distributor authentication and authorization. For example, during periods of high-traffic for a provider (e.g., breaking news, the beginning of a sporting event, etc.), multi-channel media distributor servers are sometimes overwhelmed with requests to authenticate viewers or verify that the viewers are authorized to access content from the programmers. The multi-channel media distributors are often not able to process requests due to having to process the extreme volume in such circumstances and the result is that many viewers do not have access to the videos at all or end up experiencing long delays without having access to the videos.

Therefore, it is desirable to automatically identify reduced availability of multi-channel media distributors so that appropriate action may be taken transparently to viewers.

SUMMARY

Embodiments are provided for automatically identifying reduced availability of multi-channel media distributors for authentication or authorization. In some embodiments, an entitlement service communicates with a multi-channel media distributor (e.g., a cable provider) to authenticate viewers requesting content from programmers, such as providers of videos or other media content on a channel, or to confirm that authenticated viewers are authorized to receive content from the programmers. Because the entitlement service is positioned between multiple programmers and the multi-channel media distributor, the entitlement service can determine whether the multi-channel media distributor is experiencing reduced availability (e.g., by failing to respond to authentication or authorization requests).

For example, the entitlement service receives requests for various programmers to provide media content to user devices, and transmits the requests to the multi-channel media distributor. The entitlement service then determines a reduced availability of the multi-channel media distributor based on, for example, an unusually low success rate for authenticating users or authorizing the users' access to content access based on the transmitted requests. For instance, if the multi-channel media distributor has historically authorized or authenticated a certain percentage of users for access to programmers' media content, and the entitlement service determines that the percentage of successful authentication or authorizations during a current period is far below that historical percentage, the low success rate indicates a reduced availability of the multi-channel media distributor during this current period. Due to this reduced availability of the multi-channel media distributor, the entitlement service provides the requesting user devices with temporary access to the media content from the programmers during a period in which the reduced availability occurs (e.g., by generating temporary tokens granting access to the programmers' content).

These illustrative features are mentioned not to limit or define the disclosure, but to provide examples to aid under-

DETAILED DESCRIPTION

Figure 1:
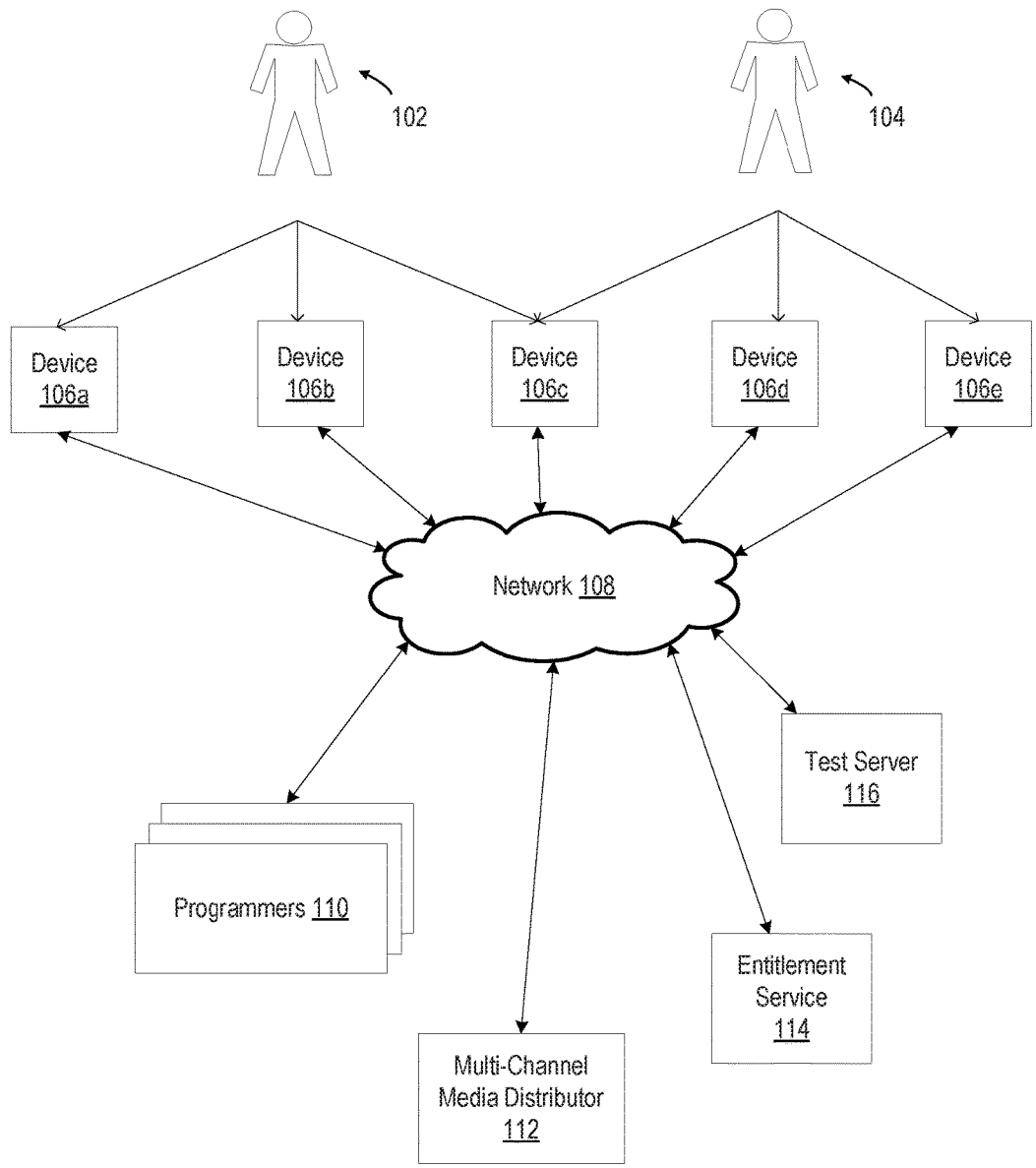
FIG. 1 is a block diagram depicting an example of a system in which users receive video from a programmer over a network.

As discussed above, existing systems, in which multi-channel media distributors provide authentication or authorization functions for media programmers, do not adequately detect that the availability of a multi-channel media distributor has been reduced. Embodiments are disclosed that automatically identify reduced availability of multi-channel media distributors for authentication or authorization. For example, an entitlement service, which is positioned in a data network between programmers and a multi-channel media distributor, analyzes data traffic involving the multi-channel media distributor and uses this analysis to determine if the multi-channel media distributor is unavailable. The entitlement service compensates for this unavailability by temporarily providing users with access to media content during the period of unavailability. This allows user devices to access media content from programmers without being impacted by the unavailability of the multi-channel media distributor.

The following example is provided to introduce certain embodiments of the present disclosure. In some embodiments, an entitlement service receives requests for programmers to provide media content to user devices and then transmits those requests to a multi-channel media distributor. The entitlement service is able to determine how frequently requests associated with different programmers result in users being authenticated by the multi-channel media distributor, being authorized by the multi-channel media distributor for access to the programmers' media content, or both. Thus, the entitlement service collects and analyzes data regarding the responsiveness of the multi-channel media distributor, and can thereby detect that the multi-channel media distributor is unavailable during a given time period. If this reduced availability is detected by the entitlement service, the entitlement service facilitates temporary access to the programmers' media content without using the multi-channel media distributor to authenticate or authorize users.

In one example, the entitlement service uses a success rate for authentication or authorization requests to determine this availability. An example of a success rate is a percentage of requests for authentication or authorization that result in successful authentications or authorizations by the multi-channel media distributor. The success rate being below 100% may not necessarily indicate an unavailability of the multi-channel media distributor, since some users may provide invalid credentials and some authenticated users may attempt to access content outside of their subscription. Thus, a given multi-channel media distributor, such as a cable company, may historically authenticate users or authorize content access for a certain percentage of these requests when the cable company is operating normally. During a certain period (e.g., the most recent hour, the most recent ten-minute block, etc.), the entitlement service determines that a lower percentage of requests for authentication or authorization were successful. This lowered success rate may indicate that the cable company is unable to service all requests (e.g., due to a spike in traffic to a given programmer).

In some embodiments, the entitlement service detects the unavailability of a multi-channel media distributor by using test requests from a test server instead of (or in addition to) live requests received from users attempting to access certain media content. In one example, the entitlement service causes a test server to transmit test requests for authentication or authorization. These artificial requests, which are generated for testing purposes rather than being generated by users attempting to access media content, include test credentials that are known to be valid by the entitlement service, and that should therefore result in a successful authentication or authorization event. The entitlement service receives these test requests and transmits the test requests to the multi-channel media distributor. One or more authentication failures or authorization failures for these test requests indicates that the multi-channel media distributor is unavailable, since the test credentials are known to be valid. Therefore, the entitlement service can take corrective action (e.g., providing temporary access to programmer content) based on identifying failed authentications or authorizations resulting from the test requests. In some embodiments, the entitlement service uses these test requests to confirm an initial determination of unavailability that is based on a low success rate for live requests.

As used herein, the term "programmer" refers to a person or business entity, or the electronic devices operated by the person or business entity, that provides video content or other media content made available on one or more channels provided by one or more multi-channel media distributors. In one example, a programmer is an entity that creates content, organizes content, or otherwise makes content available for multiple media channels (e.g., television channels). Programmers also make their media content available to users via networks other than the dedicated networks of the multi-channel media distributors. In one example, a programmer publishes a mobile device application for installation on client devices that accesses video content from the programmer directly for display on the mobile devices. In another example, a programmer publishes a website that includes a plugin or other component that accesses video content from the programmer directly for display on client devices.

As used herein, the term "media content" refers to time-based video content, audio content, or some combination thereof that is playable on a television or other electronic device. In one example, a video is provided over a network as a file that is saved locally on a client device for subsequent playback. In another example, video is streamed over a network for playback on the client device. A variety of types of electronic devices play back the video for a user. As examples, any of a television, desktop computer, laptop, mobile phone, mobile computing device, tablet, Internet-of-things device, automobile electronic system, or any other electronic device having display or audio capabilities to display graphics or play sound can be used to play a streamed or downloaded video.

As used herein, the term "user" refers to a person, or a device operated by the person, that requests or receives downloaded or streamed videos from a programmer or multi-channel media distributor. A user has a subscription with a multi-channel media distributor in some embodiments. In some embodiments, a user uses a mobile device with multiple apps that access publishers to receive and view videos based on subscription credentials for a multi-channel media distributor that separately provides videos to the user through a separate dedicated network.

As used herein, the term "subscription" refers to a user having an account to receive television or other videos for multiple channels from a multi-channel media distributor. A subscription in some embodiments is time-based. For example, a user pays a monthly fee to receive television content from a multi-channel media distributor cable company at the user's residence. In another embodiment, the user pays a monthly fee to access videos from multiple sources through the Internet and also uses the Internet to access additional videos directly from programmers through the Internet.

As used herein, the term "multi-channel media distributor" refers to a service that distributes videos or other media content for multiple channels from one or more programmers to multiple users. A multi-channel media distributor typically provides videos based on user subscriptions and to users via a dedicated network. For example, a cable company provides multi-channel television videos over a cable network.

As used herein, the term "authenticate" refers to determining that a user is associated with a particular identity, account, or subscription maintained by a multi-channel media distributor. Authenticating a user is based on a user name and password provided by the user in some embodiments.

As used herein, the term "authorized" refers to a user having permission based on the user's identity, account, or subscription with a multi-channel media distributor to access a particular video. In one example, an authenticated user will have authorization to access some videos, but not other videos.

These illustrative examples are given to introduce the reader to the general subject matter discussed here and are not intended to limit the scope of the disclosed concepts. The following sections describe various additional aspects and examples with reference to the drawings in which like numerals indicate like elements, and directional descriptions are used to describe the illustrative examples but, like the illustrative examples, should not be used to limit the present disclosure.

Referring now to the drawings, FIG. 1 is a block diagram depicting an example of a system in which users 102, 104 attempt to receive video or other media content from one or more programmers 110 over one or more data networks 108. In this example, the user 102 accesses the data network 108 with user devices 106a-c, and the user 104 accesses the data network 108 with user devices 106c-e. It is possible for users to use any number of devices and for each device to be shared by any number of users.

In this example, the users 102, 104 have subscriptions to receive television or other media content from a multi-channel media distributor 112 through a dedicated network (not shown). The users 102, 104 access media content (e.g., videos) on one or more of devices 106a-e by contacting one or more programmers 110. Computing devices associated with the programmers 110 provide the requested media content if the subscriptions of the users are authenticated and the authorization for the particular media content is confirmed with the multi-channel media distributor 112.

In this example, an entitlement service 114 is used to authenticate the subscriptions and confirm the authorizations. The entitlement service 114, which includes suitable program code executed by one or more processing devices, communicates with the multi-channel media distributor 112 via one or more data networks 108. The entitlement service 114 receives requests for media content from one or more of the programmers 110, one or more of the user devices 106a-e, or both via the data network 108. The entitlement service 114 transmits the requests (or data derived from the requests) to the multi-channel media distributor 112, which performs authentication or authorization operations for various user devices on behalf of the programmers 110.

In some circumstances, the multi-channel media distributor 112 is unavailable (or experiences reduced availability) for performing these authentication or authorization functions. For example, the responsiveness of the multi-channel media distributor 112 may be degraded if a high volume of user devices request authentication or authorization during high-traffic events, such as live events, breaking news, and other videos that draw a large audience. In these circumstances, the entitlement service 114 determines that temporary access should be granted to one or more of the requesting user devices 106a-e.

In some embodiments, the entitlement service 114 determines that the responsiveness of the multi-channel media distributor 112 has degraded (i.e., that the multi-channel media distributor 112 is experiencing reduced availability) based on comparing a current responsiveness of the multi-channel media distributor 112 to a historic responsiveness of the multi-channel media distributor 112. In one example, as described herein, if the multi-channel media distributor 112 fails to authenticate or authorize 50% of requests received over the last hour to provide access to media content from the programmers 110, the entitlement service 114 compares the 50% success rate to one or more historical success rates indicating how frequently the multi-channel media distributor 112 authenticates users or authorizes content access by authenticated users. If a historical success rate is 80%, the 50% success rate over the last hour (or other suitable interval) indicates a lack of responsiveness by the multi-channel media distributor 112.

In some embodiments, the entitlement service 114 generates or uses test requests (e.g., artificially generated traffic) to verify the responsiveness of the multi-channel media distributor 112, as described herein. For example, the entitlement service 114 communicates with a test server 116 to generate test requests for authentication or authorization. The test server 116 sends these test requests to the entitlement service 114 via the data network 108. The test requests include test credentials, which are known to be valid, to verify the responsiveness of the multi-channel media distributor 112. If the entitlement services 114 transmits the test requests to the multi-channel media distributor 112 and the transmitted requests do not result in a successful authentication or authorization, the entitlement service 114 determines that the multi-channel media distributor 112 is experiencing reduced availability as opposed to, for example, simply rejecting a large number of invalid requests from users. In additional or alternative embodiments, a separate test server 116 may be omitted, and the same server or computing device can execute both the entitlement service 114 and a test service that generates test requests.

In some embodiments, the entitlement service 114 determines whether this temporary access should be continued by determining if the multi-channel media distributor 112 is available again. For example, the entitlement service 114 may request responses from multi-channel media distributor 112 after providing temporary access to user devices during a period of limited availability for the multi-channel media distributor 112. If a response is received, the entitlement service 114 determines, based on the response, whether to continue allowing the programmer 110 to provide media content or to cause the programmer 110 to terminate the provision of the media content. For example, if a response from the multi-channel media distributor indicates that the user 102 is not authorized to watch a video that is being streamed based on a temporary grant of access, the entitlement service 114 will instruct the programmer 110 to cut off the streaming of the video.

Figure 2:
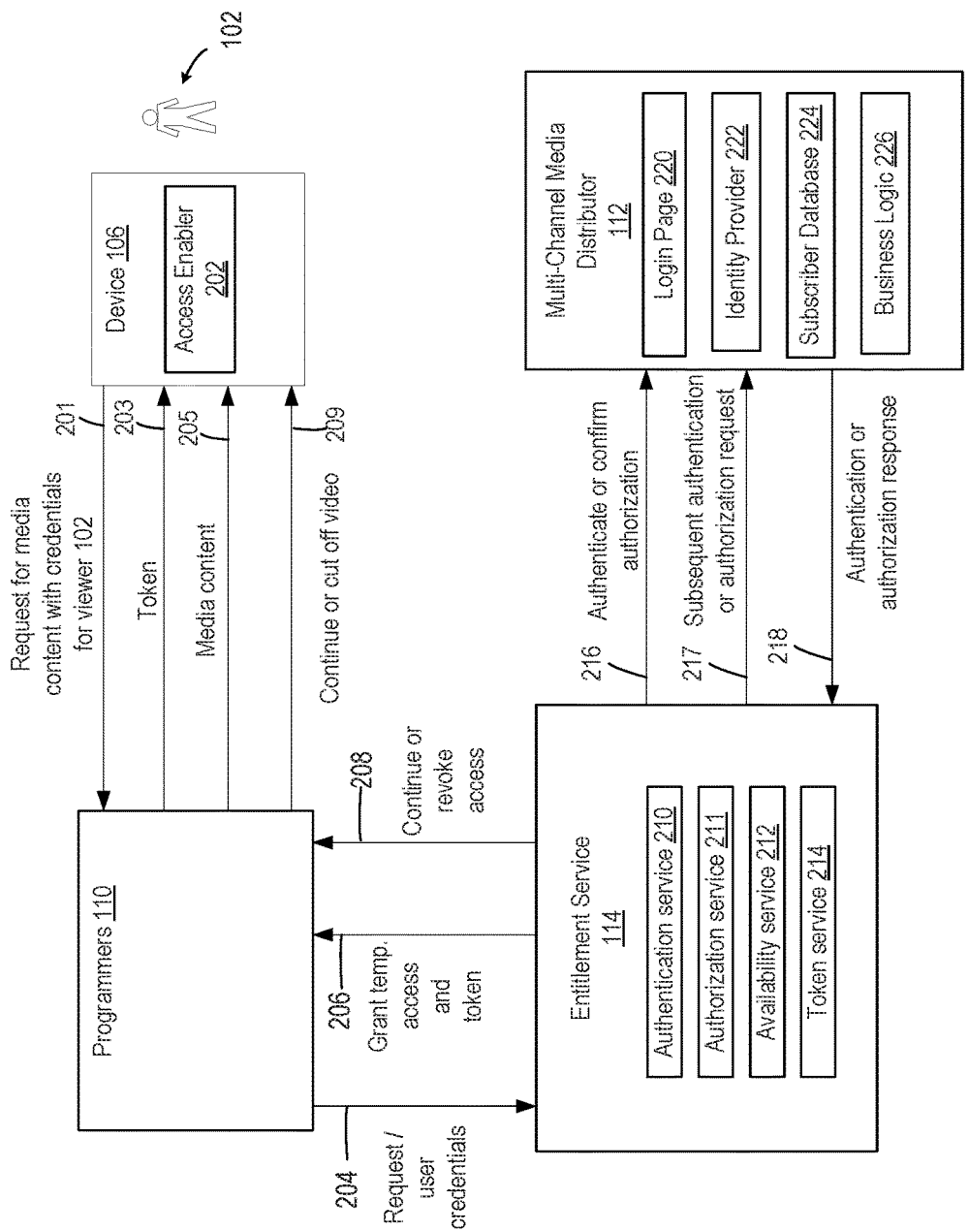
FIG. 2 is a block diagram illustrating communication between user devices, programmer devices, an entitlement service, and a multi-channel media distributor.

FIG. 2 is a block diagram illustrating communication between user devices, a programmer 110, an entitlement service, and a multi-channel media distributor backend. FIG. 2 illustrates an access enabler 202 that is executed on the user device 106, which is representative of any of the devices 106a-e depicted in FIG. 1. The programmer 110 interacts with the entitlement service 114 and the access enabler 202, which allows users to be authenticated, authorized, or both when attempting to access media content provided by the programmer 110. For example, the access enabler 202 facilitates exchanges of entitlement data (e.g., authentication data, authorization data, etc.) between the user device 106 and the multi-channel media distributor 112 by communicating entitlement data to the programmer 110, which in turn provides the entitlement data to the entitlement service 114. The entitlement service 114 also facilitates authentication and authorization confirmation interactions based on information received from the programmer 110.

The access enabler 202 is executed locally on the user device 106. The access enabler 202 executes in the background (e.g., in a manner invisible to the user) to authenticate and confirm authorization of the user for requested videos. For example, the user 102 accesses the website or application of the programmer 110 and thereby requesting a video or other media content. The access enabler 202 on the user device 106 transmits, based on the user 102 requesting the video or other media content, relevant user data or device data to a computing device associated with the programmer 110.

In FIG. 2, the programmer 110 receives a request, in an electronic message 201, for media content from the user device 106 via a data network. The access enabler 202 facilitates this communication between the user device 106 and one or more programmers 110. The request identifies a name and password for the user 102 that identify an identity, account, or other subscription information for the user 102 to the multi-channel media distributor 112. In additional or alternative embodiments, other suitable credentials are used to identify the user 102 to the multi-channel media distributor 112. The programmer 110 sends, in an electronic message 204, the request and credentials to the entitlement service 114. The programmer 110 transmits this communication based on, for example, being configured to authenticate and authorize users using the entitlement service 114.

The entitlement service 114 includes an authentication service 210, an authorization service 211, an availability service 212, and a token service 214. The entitlement service 114 uses these sub-services to access the multi-channel media distributor 112 over one or more data networks. The entitlement service 114 accesses the multi-channel media distributor 112 to authenticate users requesting content from the programmers. In some embodiments, accessing the multi-channel media distributor 112 involves accessing the multi-channel media distributor 112 to authenticate that the user has a subscription with the multi-channel media distributor 112 or confirm that the user is authorized to receive the media content from one or more programmers 110. Additionally or alternatively, the entitlement service 114 accesses the multi-channel media distributor 112 to confirm that authenticated users are authorized to receive media content from one or more of the programmers 110.

In some embodiments, the authentication service 210 and the authorization service 211 generate, based on the entitlement service 114 receiving the message 204, an electronic message 216 that includes a request for the multi-channel media distributor 112 to authenticate the user 102. For example, the message 216 may be used to request, instruct, or otherwise cause the multi-channel media distributor 112 to determine whether the user name and password match those of an authorized user identity, account, or subscription maintained by the multi-channel media distributor 112 or an accessible third party. For example, transmitting the message 216 involves accessing a login page 220 and providing the user name and password (or other suitable credentials) to attempt a login.

In one example, the multi-channel media distributor 112 uses an identity provider module 222 that confirms the identity of the user with a third-party identity service. In another example, the multi-channel media distributor 112 uses a subscriber database 224 to determine whether the user 102 is an authenticated user with a subscription to the multi-channel media distributor 112.

In some embodiments, the message 216 also identifies the video or other media content requested by the user 102, the programmer 110, or both. This identification allows the multi-channel media distributor 112 to determine whether the user 102 is authorized to access the particular video or to access videos from the particular programmer 110. For example, if a subscription for the user 102 does not include a premium movie channel, the multi-channel media distributor 112 will not authorize the user to have access to movies provided by the premium movie channel programmer 110.

In some embodiments, the multi-channel media distributor 112 also executes business logic 226 that includes business rules for making authentication and authorization determinations. In one example, the business rules identify which videos are available for different subscription classes, pay-per-view requirements for particular videos, and other business rules useful in controlling user authentication, authorization, or both.

In the example shown in FIG. 2, the availability service 212 of the entitlement service 114 determines that the entitlement service 114 does not receive an immediate response to the message 216 from the multi-channel media distributor 112. After a predetermined amount of time passes, the availability service 212 determines that the multi-channel media distributor 112 is unable to provide a timely response. Based on this determination, the entitlement service provides or otherwise facilitates temporary access for the user 102 to media content from programmer 110.

In some embodiments, under normal operating conditions (e.g., the multi-channel media distributor 112 responding to requests from the entitlement service 114), the entitlement service 114 generates a token using a token service 214 and transmits, to the programmer 110 via a data network, the token in an electronic message 206. During these normal operating conditions, the entitlement service 114 generates the token based on receiving confirmation of authentication, authorization, or both from the multi-channel media distributor 112. The programmer 110 sends an electronic message with the token and streams or otherwise sends media content to the user device 106.

However, if the availability service 212 determines that the multi-channel media distributor 112 is unable to provide a timely response, the entitlement service 114 uses the token service 214 to grant temporary access. For example, the token service 214 generates a token without the entitlement service 114 receiving confirmation of authentication or authorization from the multi-channel media distributor 112. In this case, as depicted in FIG. 2, the programmer 110 sends an electronic message 203 with the token and streams or otherwise sends the media content 205 (e.g., a video) to the user device 106. The user 102 is thus able to view the media content 205 while the multi-channel media distributor 112 is unavailable.

In some embodiments, the token in the message 201 includes a time-to-live or other appropriate parameter based on preferences of the programmer 110. For example, a short time-to-live parameter is included if the programmer 110 desires tighter control of the video. Such control may include, for example, requiring the user to request access again at the conclusion of the time-to-live period.

After the multi-channel media distributor 112 becomes available again, the multi-channel media distributor 112 transmits a subsequent message 218 with information identifying whether the user 102 is authenticated or authorized to access the particular media content 205 from the particular programmer 110. For example, since a message 216 sent during a period of reduced availability is lost, the entitlement service 114 sends a subsequent message 217 regarding a user's access rights (e.g., a request for authentication, authorization, or both). The multi-channel media distributor 112 responds to the message 217 by transmitting the message 218. Based on this subsequent message 218, the entitlement service 114 sends an electronic message 208 to the programmer 110 to continue access or revoke access to the media content 205.

The programmer 110, based on receiving the message 208, sends an electronic message 209 to the device 106 with instructions to continue access to the media content 205 or terminate the access to the media content 205. In one example, the message 209 may extend the time-to-live on the token included in the message 203. In another example, the message 209 may include a new access or revocation token with parameters configured to allow the media content 205 to continue to completion or to terminate playback of the media content 205. In the case of streaming of the media content 205, the programmer 110 will stop streaming the media content 205 if the message 208 indicates that access by the user 102 to the media content 205 should be revoked or otherwise terminated.

In some embodiments, the access enabler 202 illustrated in FIG. 2 provides a modular solution for implementing authentication and authorization by a multi-channel media distributor with sophisticated degradation capabilities in the programmer's application and website. In some embodiments, the access enabler 202 is configured to execute locally on device 106 of the user 102, for example, as a plugin within a native application or web page provided by the programmer 110. The access enabler 202 on the user device 106 interacts with the programmer 110 device to handle programmer-configured entitlement workflows in a flexible and secure manner.

In some embodiments, computing devices associated with the programmer 110 are used to create and maintain the higher-level web pages or native applications that implement a user software interface for viewing media content. Appropriate functionality is incorporated into these web pages or native applications to implement the authentication and authorization using the multi-channel media distributor 112. The programmer 110, in some embodiments, specifies appropriate interactions using an asynchronous system of functions and callbacks defined by an Application Programming Interface ("API"). Examples of entitlement flows that are easily implemented using such an API include, but are not limited to, setting the programmer identity, checking or obtaining user authentication against a particular identity provider, checking or obtaining user authorization for a particular video or from a particular programmer, and logging out the user.

In some embodiments, if the multi-channel media distributor 112 is unavailable, the entitlement service 114 is used to bypass authentication or authorization verifications by the multi-channel media distributor 112. The entitlement service 114 instead provides temporary access to media content by a user for a set period of time or until the multi-channel media distributor 112 is determined to again be available. The result is that the user is not blocked from accessing video content that they should otherwise (absent the multi-channel media distributor system unavailability) be able to access. The entitlement service 114 may determine that the multi-channel media distributor 112 is back online, and then resume normal operations in which requests for authentication or confirmation are serviced by the multi-channel media distributor 112.

In some embodiments, such as the example depicted in FIG. 2, the position of the entitlement service 114 between multiple programmers 110 and a multi-channel media distributor 112 allows the entitlement service 114 to automatically identify a reduced availability of the availability of the multi-channel media distributor 112. For example, the entitlement service 114 transmits multiple messages 216 that include requests for the multi-channel media distributor 112 to authenticate or authorize various users' access to media content provided by programmers 110. The entitlement service 114 can determine how frequently these authentication or authorization requests fail. If these requests are resulting in a percentage of authentication or authorization requests that appear anomalous, the entitlement service 114 determines that the multi-channel media distributor 112 is unavailable (or is at least experiencing a period of reduced availability). Based on this determination, the entitlement service 114 provides or otherwise facilitates temporary access to media content of one or more programmers 110 by one or more user devices 106.

Figure 3:
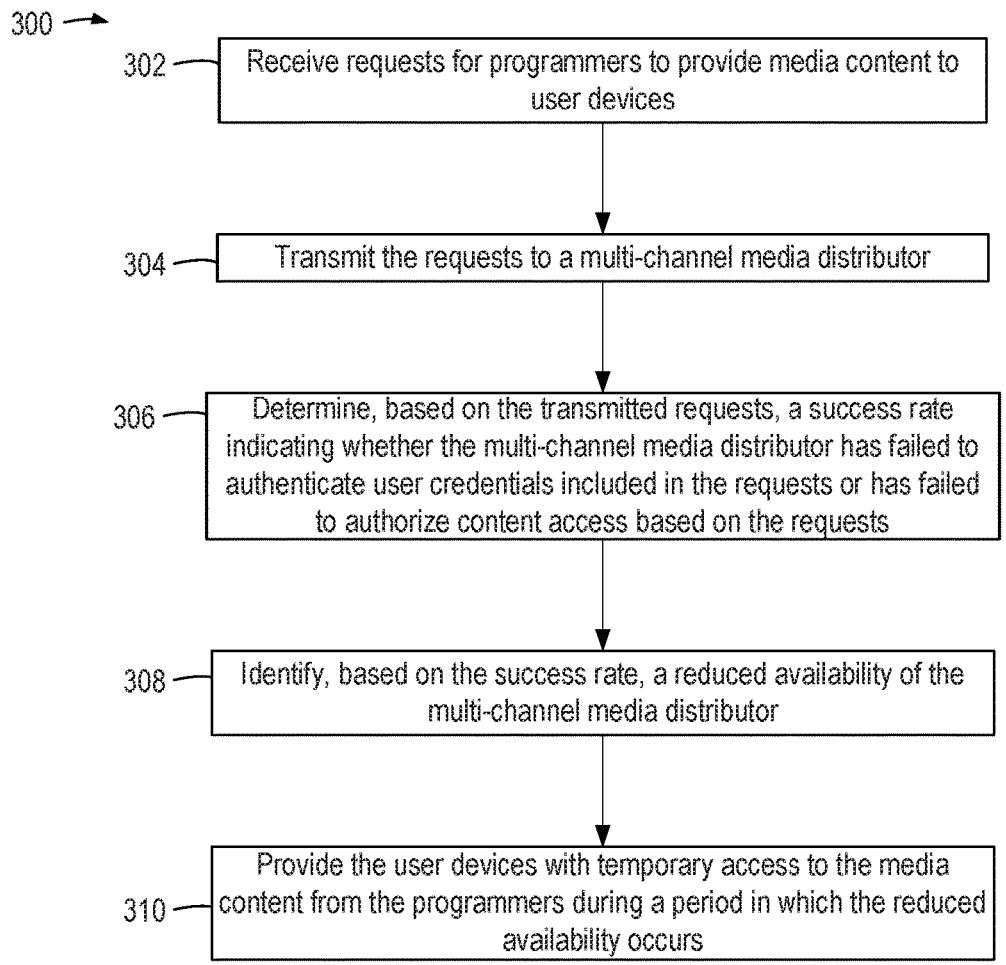
FIG. 3 is a flow chart depicting an example of a process for automatically identifying a reduced availability of a multi-channel media distributor for authentication or authorization.

In such embodiments, the entitlement service 114 executes one or more suitable operations for determining that the multi-channel media distributor 112 is unavailable. For example, FIG. 3 is a flow chart depicting an example of a process 300 for automatically identifying a reduced availability of a multi-channel media distributor 112 for authentication or authorization. In some embodiments, one or more processing devices implement operations depicted in FIG. 3 by executing suitable program code (e.g., the entitlement service 114 and the availability service 212). For illustrative purposes, the process 300 is described with reference to the examples depicted in FIGS. 1 and 2. Other implementations, however, are possible.

At block 302, the process 300 involves receiving requests for programmers to provide media content to user devices. In some embodiments, the requests received at block 302 are live requests received from computing devices associated with the programmers 110. For example, at least one processing device executes the entitlement service 114 to communicate with multiple computing devices associated with programmers 110, with multiple access enablers 202 executed by user devices 106, or both. The entitlement service 114 communicates via, for example, one or more suitable data networks 108. The entitlement service 114 receives, in one or more time periods, multiple requests in multiple messages 204 from multiple programmers 110. Examples of how these messages 204 are generated and transmitted to the entitlement service 114 are described above with respect to the example depicted in FIG. 2.

At block 304, the process 300 involves transmitting the requests to a multi-channel media distributor. For example, at least one processing device executes one or more of the authentication service 210 and the authorization service 211 of the entitlement service 114. In the example depicted above with respect to FIG. 2, by executing the authentication service 210, the authorization service 211, or both, the processing device is configured to generate messages 216, which include requests for authentication or authorization with user credentials (e.g., user names and passwords) provided to the entitlement service 114 by access enablers. The entitlement service 114 transmits the requests to the multi-channel media distributor 112 via one or more suitable data networks 108.

At block 306, the process 300 involves determining, based on the transmitted requests, a success rate indicating whether the multi-channel media distributor has failed to authenticate user credentials included in the requests or has failed to authorize content access based on the requests. For example, at least one processing device executes the availability service 212 of the entitlement service 114 to determine the responsiveness of the multi-channel media distributor 112 to the transmitted requests. The entitlement service 114 determines the responsiveness based on whether the transmitted requests result in successful authentication of credentials included in the requests, successful authorization of content access based on credentials included in the requests, or both.

For example, this can be based on the entitlement service waiting for a predetermined amount of time to pass without receiving a response. In an alternative embodiment, the entitlement service determines that the multi-channel media distributor is not available based on a history of communications with the multi-channel media distributor 112, statistics regarding the multi-channel media distributor 112, or both. The history or statistics include information about attempts to contact the multi-channel media distributor 112 on behalf of multiple, different programmers in one embodiment. Because information for multiple programmers is used, multi-channel media distributor issues are identified faster and more accurately than they otherwise would be identified.

In embodiments involving live requests, which are transmitted by the access enablers 206a at programmers 110 based on communications with access enablers 206b at user devices 106, the entitlement service 114 determines the responsiveness by comparing a success rate for a recent time period with a success rate for an historical time period. For example, the entitlement service 114 stores records of received live requests in a non-transitory computer-readable medium using a database or other suitable data structure. The records can include time stamps for the live requests and indications of whether the multi-channel media distributor 112 authenticated users or authorized the users' content access. Examples of these indications include a "success" flag, a "failure" flag, a "time-out" flag, or any other data describing the result of sending authentication or authorization requests to the multi-channel media distributor 112. As described herein with respect to FIG. 4, if a recent success rate deviates from an historical success rate, the entitlement service 114 determines that the multi-channel media distributor 112 is experiencing reduced availability.

In additional or alternative embodiments, the requests used in blocks 302, 304, and 306 are test requests that are generated or used for the purpose of checking the availability of the multi-channel media distributor 112. For example, a processing device can execute the entitlement service 114 to communicate with a separate test server 116 or a testing service executed at the same computing system as the entitlement service 114. The entitlement service 114 causes the test server 116 or a testing service to generate and send test requests with test credentials known to be valid. The entitlement service 114 uses the test credentials to determine the availability of the multi-channel media distributor, as described herein with respect to FIG. 5.

At block 308, the process 300 involves identifying, based on the success rate, a reduced availability of the multi-channel media distributor. For example, at least one processing device executes the availability service 212 of the entitlement service 114 to identify a reduced availability of the multi-channel media distributor 112. In some embodiments, the entitlement service 114 determines the reduced availability based on a success rate during a recent time period being below a threshold success rate determined from historical data, as described herein with respect to FIG. 4. In other embodiments, the entitlement service 114 determines the reduced availability based on a low success rate associated with sending test requests, which have credentials known to be valid, to the multi-channel media distributor 112, as described herein with respect to FIG. 5.

At block 310, the process 300 involves providing the user devices with temporary access to the media content from the programmers during a period in which the reduced availability occurs. For example, at least one processing device executes the token service 214 or other suitable program code of the entitlement service 114 to provide user devices 106 with temporary access to media content from one or more of the programmers. Examples of the entitlement service 114 providing temporary access to the media content are described herein with respect to FIGS. 6 and 7.

Figure 4:
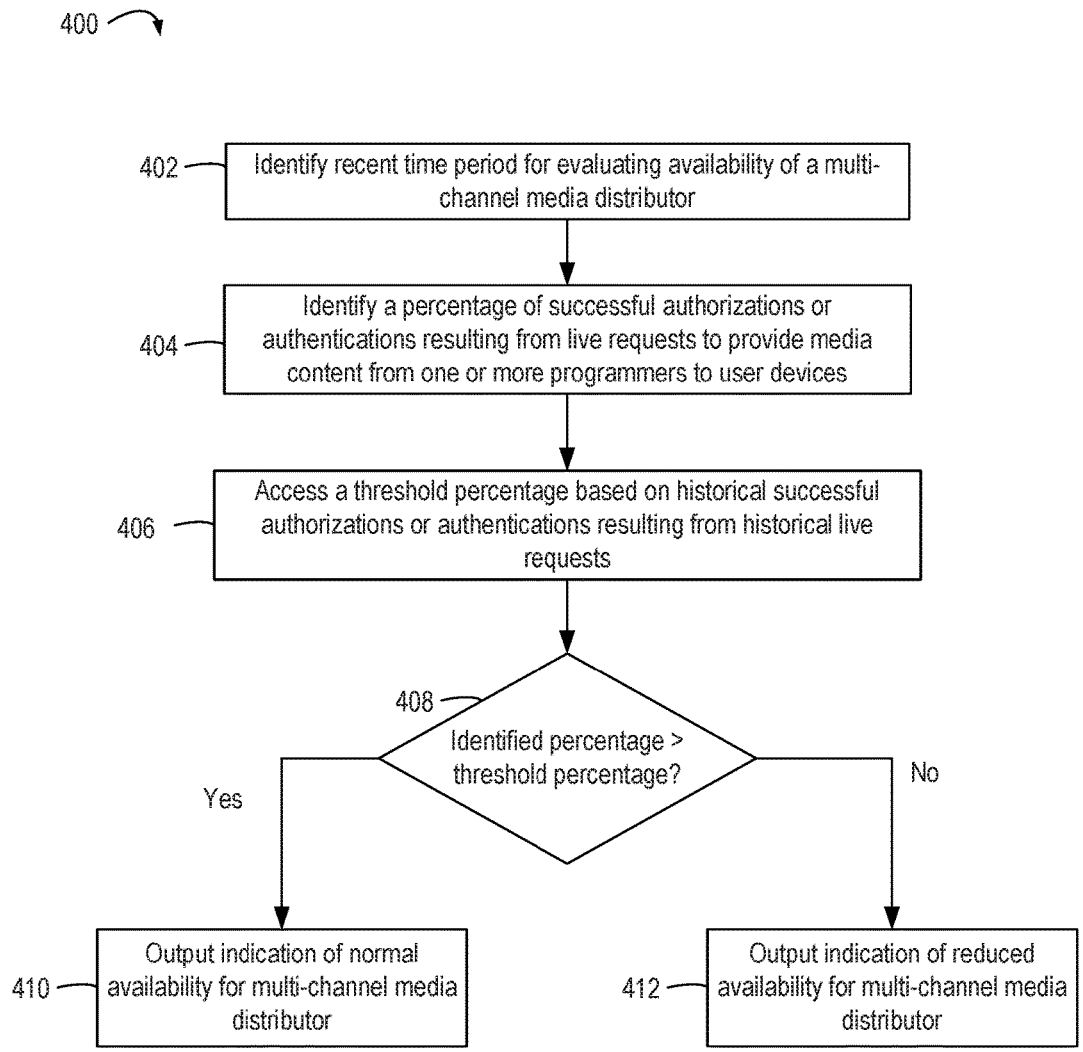
FIG. 4 is a flow chart depicting an example of a process for determining a reduced availability of the multi-channel media distributor using live requests for authentication or authorization.

The entitlement service 114 uses any suitable algorithm to determine a success rate used for determining a reduced availability of the multi-channel media distributor 112. In some embodiments, determining the success rate involves, at least partially, using analytics data generated by the entitlement service 114 for real-time traffic between programmers 110 and the multi-channel media distributor 112. For example, FIG. 4 is a flow chart depicting an example of a process 400 for determining a reduced availability of the multi-channel media distributor 112 using live requests for authentication or authorization. In some embodiments, one or more processing devices implement operations depicted in FIG. 4 by executing suitable program code (e.g., the entitlement service 114 and the availability service 212). For illustrative purposes, the process 400 is described with reference to the examples depicted in FIGS. 1-3. Other implementations, however, are possible.

At block 402, the process 400 involves identifying a recent time period for evaluating availability of a multi-channel media distributor. For example, at least one processing device executes the entitlement service 114 to identify the time period. Any suitable time period may be used by the entitlement service. In one example, the entitlement service uses the most recent multi-minute period (e.g., the last three to five minutes).

At block 404, the process 400 involves identifying a percentage of successful authorizations or authentications resulting from live requests to provide media content from one or more programmers to user devices. For example, at least one processing device executes the entitlement service 114 to calculate the percentage of successful authorizations or authentications during the identified evaluation time period. In one example, the entitlement service 114 calculates the percentage of successful authorizations or authentications over a sliding window of three-to-five minutes.

At block 406, the process 400 involves accessing a threshold percentage based on historical successful authorizations or authentications resulting from historical live requests. For example, at least one processing device executes the entitlement service 114 to access the threshold percentage from a non-transitory computer-readable medium.

In some embodiments, the entitlement service 114 calculates the threshold percentage based on historical data. For instance, the entitlement service 114 accesses records of received live requests from a database or other suitable data structure in a non-transitory computer-readable medium. The records include time stamps for the live requests and indications of whether the multi-channel media distributor 112 authenticated users or authorized the users' content access. Examples of these indications include a "success" flag, a "failure" flag, a "time-out" flag, or any other data describing the result of sending authentication or authorization requests to the multi-channel media distributor 112. The entitlement service 114 selects the records for a suitable historical time period (e.g., the most recent month, the most recent day, or the most recent hour). The entitlement service 114 calculates a percentage of the records that indicate a successful authentication or authorization.

At block 408, the process 400 involves determining whether the identified percentage of successful authorizations or authentications is greater than the threshold percentage. For example, at least one processing device executes the entitlement service 114 to compare the identified percentage and the threshold percentage accessed from the non-transitory computer-readable medium.

If the identified percentage is greater than the threshold percentage, the process 400 involves outputting an indication of normal availability for the multi-channel media distributor, as shown at block 410. For example, at least one processing device executes the availability service 212 to output an indicator of normal availability. The entitlement service 114, based on the indicator of normal availability, forwards subsequent requests for authentication or authorization (e.g., the messages 204 depicted in FIG. 2) to the multi-channel media distributor 112.

If the identified percentage is less than the threshold percentage, the process 400 involves outputting an indication of reduced availability for the multi-channel media distributor, as shown at block 412. For example, at least one processing device executes the entitlement service 114 to output an indicator of reduced availability. In some embodiments, the entitlement service 114, based on the indicator of reduced availability, begins (or continues) responding to subsequent requests for authentication or authorization (e.g., the messages 204 depicted in FIG. 2) by providing temporary access to media content from the programmers 110 to the user devices 106.

In some embodiments, the entitlement service 114 uses analytics data for one or more specific programmers 110 to determine a reduced availability of the multi-channel media distributor 112. In one example, the entitlement service 114 may use the success rate for a given programmer 110 at block 404 and may use historical data for that programmer to determine the threshold percentage accessed at block 406. In another example, the entitlement service 114 may use the success rate for a given programmer 110 at block 404 and may use historical data for all programmers to determine the threshold percentage accessed at block 406. In other embodiments, the entitlement service 114 uses analytics data for multiple programmers 110 (and possibly all programmers 110) at blocks 404, 406 to determine the reduced availability of the multi-channel media distributor 112.

Figure 5:
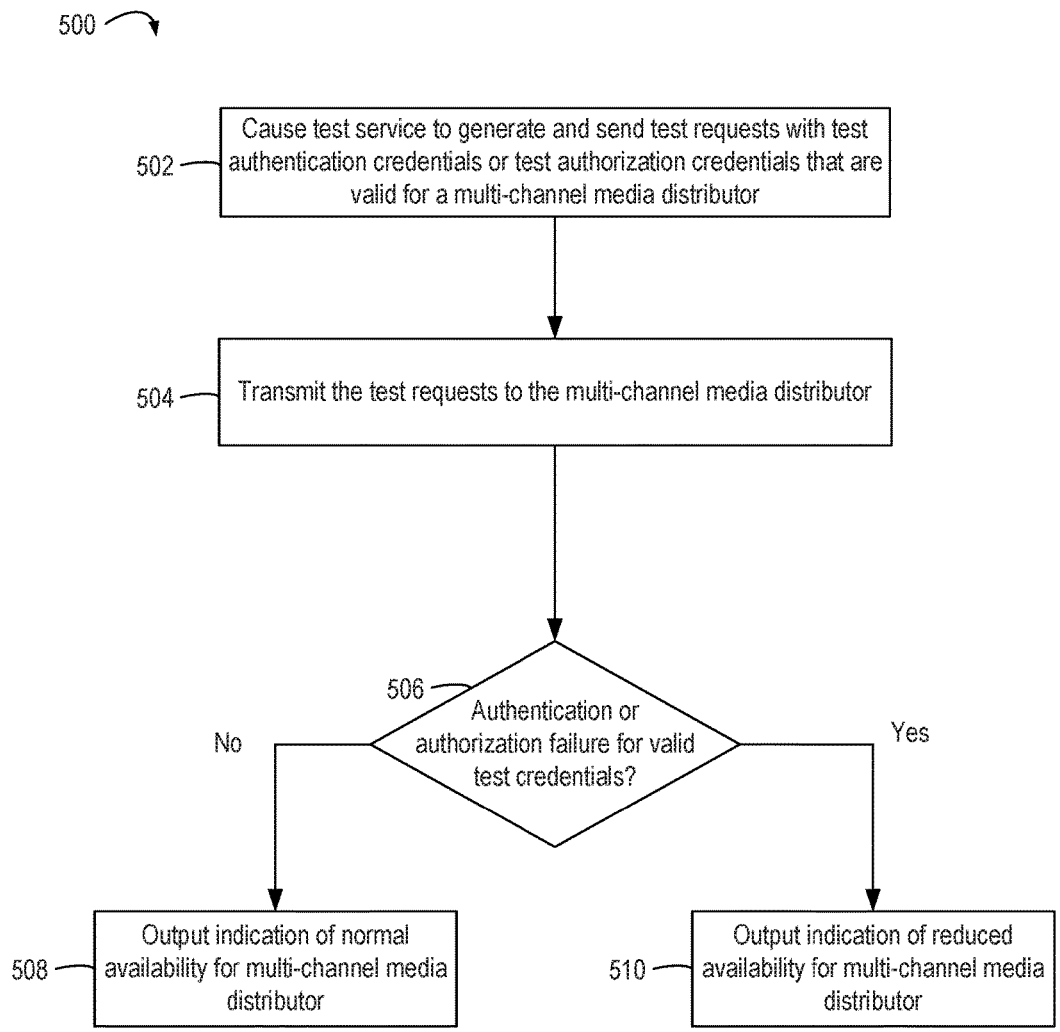
FIG. 5 is a flow chart depicting an example of a process for determining a reduced availability of the multi-channel media distributor using test requests generated for verifying the availability of the multi-channel media distributor.

In additional or alternative embodiments, determining a success rate involves, at least partially, using analytics data generated by the entitlement service 114 for artificial traffic between a testing service and the multi-channel media distributor 112 via the entitlement service 114. For example, FIG. 5 is a flow chart depicting an example of a process 500 for determining a reduced availability of the multi-channel media distributor 112 using test requests generated for verifying the availability of the multi-channel media distributor 112. In some embodiments, one or more processing devices implement operations depicted in FIG. 5 by executing suitable program code (e.g., the entitlement service 114 and the availability service 212). For illustrative purposes, the process 500 is described with reference to the examples depicted in FIGS. 1-4. Other implementations, however, are possible.

At block 502, the process 500 involves causing a test service to generate and send test requests with test authentication credentials or test authorization credentials that are valid for a multi-channel media distributor. For example, at least one processing device executes the entitlement service 114 to cause the test service to generate and send the test requests. The test requests include one or more of test authentication credentials and test authorization credentials that are valid for the multi-channel media distributor. In some embodiments, these test credentials are generated using the entitlement service 114 specifically for verifying the responsiveness of the multi-channel media distributor 112, and are not used by user devices 106. In additional or alternative embodiments, these test credentials are verified user credentials associated with one or more users 102, 104. For example, if certain user credentials received from one or more user devices 106 has resulted in a successful authentication or authorization within a threshold time period (e.g., the most recent day), the test service stores these user credentials as test credentials.

In some embodiments, the test service is executed on a test server 116 that is accessible by the entitlement service 114 via a data network. The availability service 212 of the entitlement service 114 generates an instruction message for the test server 116 to generate and transmit the test requests to the entitlement service 114. The entitlement service 114 transmits the instruction message to the test server 116 via one or more data networks 108. In other embodiments, the test service is executed on a computing system that also executes the entitlement service 114. The availability service 212 of the entitlement service 114 instructs the test service to generate the test requests and provide the test requests to the entitlement service 114.

At block 504, the process 500 involves transmitting the test requests to the multi-channel media distributor. For example, at least one processing device executes the entitlement service 114 to transmit the test requests to the multi-channel media distributor 112. These test requests are transmitted in the same manner as live requests.

At block 506, the process 500 involves determining if one or more authentication or authorization failures results from transmitting the test requests to the multi-channel media distributor. For example, at least one processing device executes the availability service 212 to determine whether one or more authentication or authorization failures have occurred. The availability service 212 determines that authentication or authorization failures have occurred based on, for example, a specified amount of time elapsing without the entitlement service 114 receiving a responsive message from the multi-channel media distributor 112 indicating a successful authentication or authorization. The lack of a successful authentication or authorization indicates or verifies a reduced availability of the multi-channel media distributor 112 at least because the test credentials included in the test requests are known by the entitlement service 114 to be valid, and therefore should have resulted in a successful authentication or authorization.

If transmitting the test requests does not result in one or more authentication or authorization failures, the process 500 involves outputting an indication of normal availability for the multi-channel media distributor, as shown at block 508. For example, at least one processing device executes the availability service 212 to output an indicator of normal availability. The entitlement service 114, based on the indicator of normal availability, forwards subsequent requests for authentication or authorization (e.g., the messages 204 depicted in FIG. 2) to the multi-channel media distributor 112.

If transmitting the test requests results in one or more authentication or authorization failures, the process 500 involves outputting an indication of reduced availability for the multi-channel media distributor, as shown at block 510. For example, at least one processing device executes the entitlement service 114 to output an indicator of reduced availability. In some embodiments, the entitlement service 114, based on the indicator of reduced availability, begins (or continues) responding to subsequent requests for authentication or authorization (e.g., the messages 204 depicted in FIG. 2) by providing temporary access to media content from the programmers 110 to the user devices 106.

In some embodiments, the entitlement service 114 combines the operations depicted in FIGS. 4 and 5. For example, the entitlement service 114 may first use real-time traffic, as depicted in FIG. 4, to make an initial determination of reduced availability. If executing the process 400 results in outputting an indication of reduced availability, the entitlement service may then execute the process 500 based on the indication of reduced availability being outputted. The process 500 uses the test requests to verify whether the indication of reduced availability generated using the process 400 resulted from a lack of responsiveness by the multi-channel media distributor 112 (e.g., if the test requests result in an authentication or authorization failure) or a large number of invalid live requests (e.g., if the test requests result in an authentication or authorization success).

Providing Temporary Access to Media Content

As discussed above, in certain cases, the entitlement service 114 grants temporary access to media content based on determining that the multi-channel media distributor is unable to respond or has experienced reduced availability. This can involve providing a token to the user that includes a time-to-live parameter that limits the useful life of the token and thus limits the duration of the temporary access. The entitlement service, in one embodiment, applies a programmer-specific rule to grant the temporary access to the user to access the video from the programmer while waiting for the multi-channel media distributor.

In some embodiments, depending on the type of video, programmer, or other circumstances, a system that includes the entitlement service 114 allows authentication, authorization, or both to be bypassed according to particular rules. One example of these rules is an "authenticate all" rule that allows all users (even those who have not previously authenticated with the system) to be granted access for a period, e.g., using a token. Another example of these rules is an "authorize all" rule that allows only users who have previously authenticated with the system to be granted access for a period of time. Previously authenticated users are given temporary access to all videos for a particular programmer that implements this rule. Another example of a rule is an "authorize none" rule that allows a programmer to identify particular channel(s) that users will not have access to when the multi-channel media distributor is unavailable. In one example, this type of channel-specific control is useful to a programmer offering a basic channel and a premium access channel who implements the rule to avoid giving access to the premium access channel during multi-channel media distributor unavailability.

In some embodiments, degradation rules are used to control or provide temporary access to media content from one or more programmers 110. For example, a programmer 110 can configure the entitlement service 114 system to implement degradation rules in a pipeline mode (e.g., applying the rules one after another). As a specific example, if the entitlement service 114 has been used to grant temporary access on two sports channels in a native application provided by a given programmer, the "authenticate all" rule is configured to take precedence, and the user will not be asked to enter a user name and password when attempting to access another video using the provider's native application. The pipeline specifies rules are based on different scenarios and can be the implementation of a logical construct inside an execution block that interprets the rules. In other embodiments, operations that do not use degradation rules may be used if the multi-channel media distributor experiences reduced availability.

Figure 6:
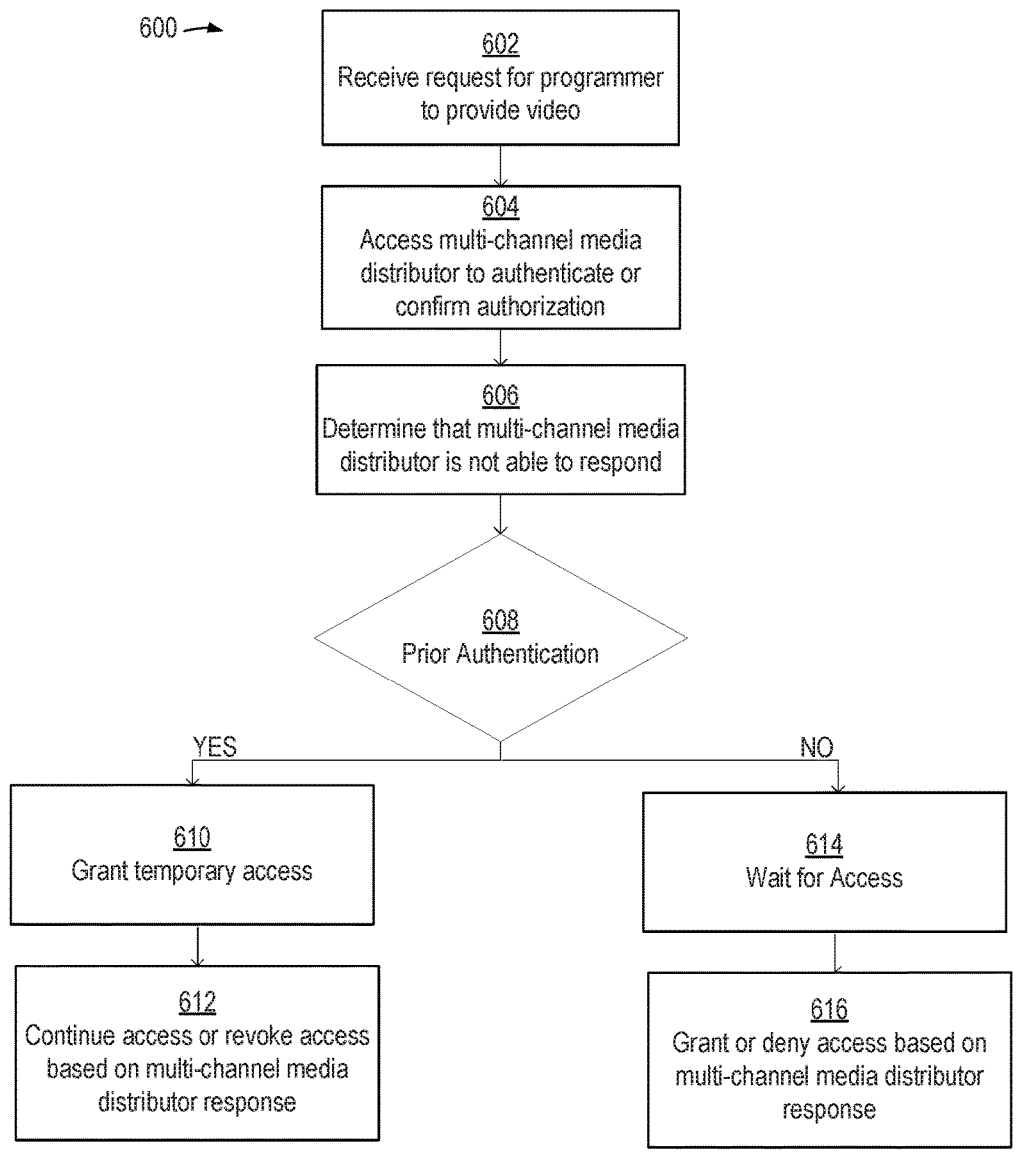
FIG. 6 is a flow chart illustrating an example of a process for granting temporary access when a multi-channel media distributor is unavailable based on a rule.

FIG. 6 is a flowchart illustrating an example of a process 600 for granting temporary access when the multi-channel media distributor is unavailable based on a rule. Process 600 is provided in an environment in which a programmer provides video content to users based on the users having subscriptions with a separate multi-channel media distributor. FIG. 6 provides an example of application of an "authorize all" rule.

In process 600, a request for a programmer to provide a video is received in block 602, a multi-channel media distributor is accessed to authenticate or confirm authorization in block 604, and the process 600 determines that the multi-channel media distributor is not able to respond or is otherwise experiencing reduced availability, as shown in block 606.

In decision block 608, process 600 determines whether the user has previously authenticated with the multi-channel media distributor. This determination is made by a service, such as entitlement service 114 of FIG. 2, separate from the multi-channel media distributor 112. To make the determination, the entitlement service 114 maintains records of prior user authentications with particular multi-channel media distributors 112 for particular programmers 110.

If the user has previously authenticated with the multi-channel media distributor 112, the process 600 grants temporary access to the user, as shown in block 610. If a subsequent response is received from the multi-channel media distributor, the process 600 continues access or revokes access to the media content based on the subsequent response, as shown in block 612.

If the user has not previously authenticated with the multi-channel media distributor, the process 600 does not grant access (and thus withholds access to the media content) while waiting for a response from the multi-channel media distributor, as shown in block 614. If a subsequent response is received from the multi-channel media distributor, the process 600 grants access based on the subsequent response, as shown in block 616.

Figure 7:
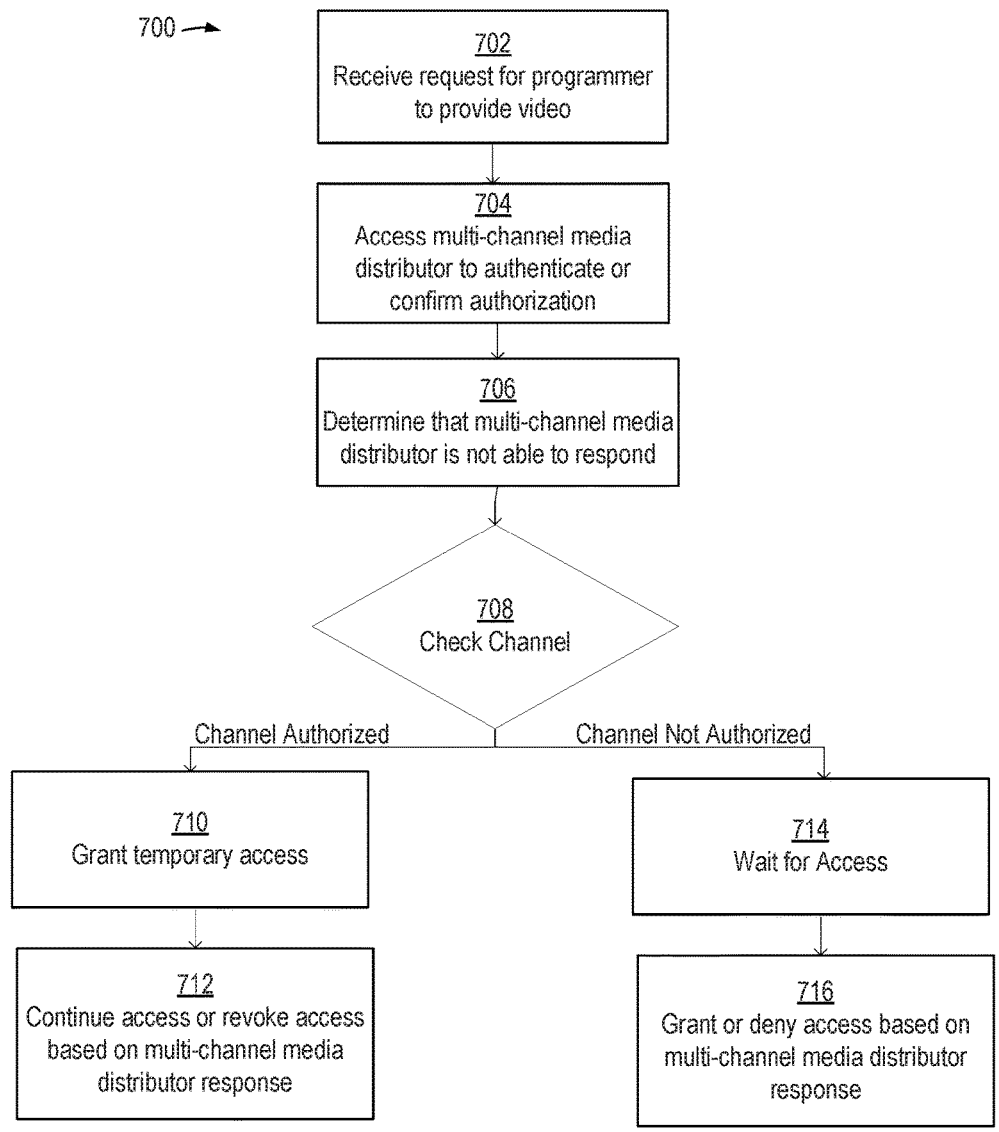
FIG. 7 is a flow chart illustrating an example of a process for granting temporary access when a multi-channel media distributor is unavailable based on a channel-specific rule.

FIG. 7 is a flowchart illustrating an example of a process 700 for granting temporary access when the multi-channel media distributor is unavailable based on a channel-specific rule. Process 700 is provided in an environment in which a programmer provides video content to users based on the users having subscriptions with a separate multi-channel media distributor. FIG. 7 provides an example of application of a channel-specific "authorize none" rule.

In the process 700, a request for a programmer to provide a video is received in block 702, a multi-channel media distributor is accessed to authenticate or confirm authorization in block 704, and the process 700 determines that the multi-channel media distributor is not able to respond as shown in block 706.

In decision block 708, the process 700 determines whether a channel associated with the requested video is authorized or not authorized. This determination is made by an entitlement service 114 that is separate from the multi-channel media distributor. To make the determination, the entitlement service 114 maintains records of publisher channel preferences.

If the channel is authorized, the process 700 grants temporary access to the user, as shown in block 710. If a subsequent response is received from the multi-channel media distributor 112, the process 700 continues access or revokes access to media content based on the subsequent response, as shown in block 712.

If the channel is not authorized, the process 700 does not grant access (and thus withholds access to the media content) while waiting for a response from the multi-channel media distributor 112, as shown in block 714. If a subsequent response is received from the multi-channel media distributor, the process 700 grants access based on the subsequent response, as shown in block 716.

Determining Restored Availability of a Multi-Channel Media Distributor

Figure 8:
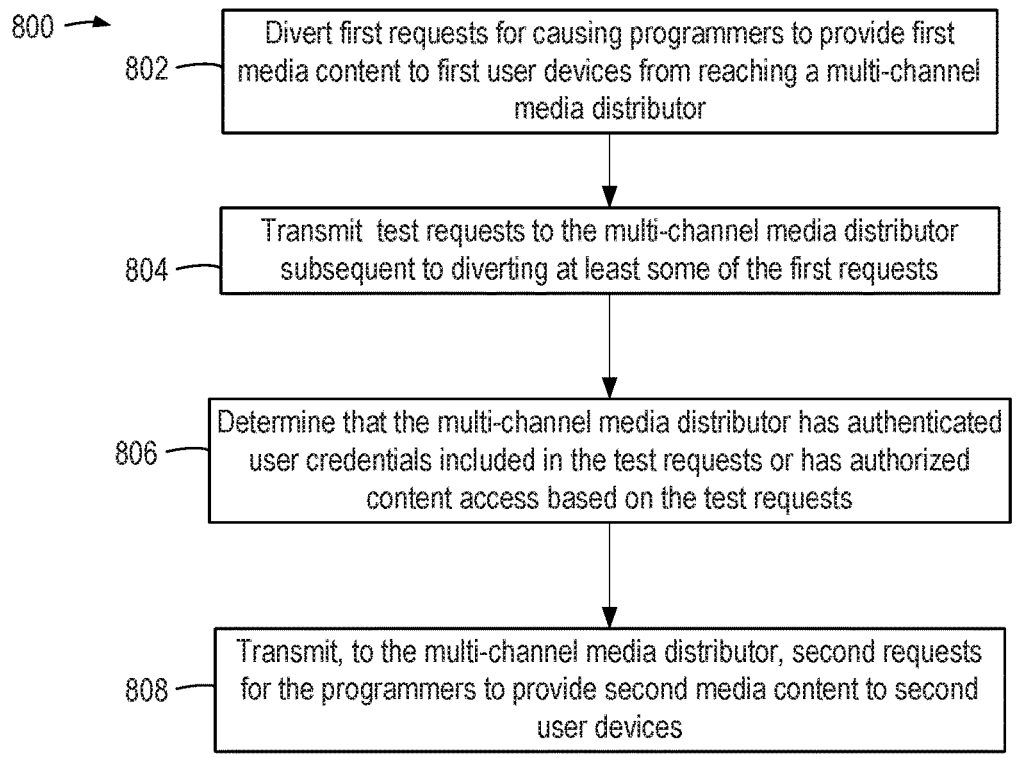
FIG. 8 is a flow chart depicting an example of a process for determining a restored availability of the multi-channel media distributor.
Figure 9:
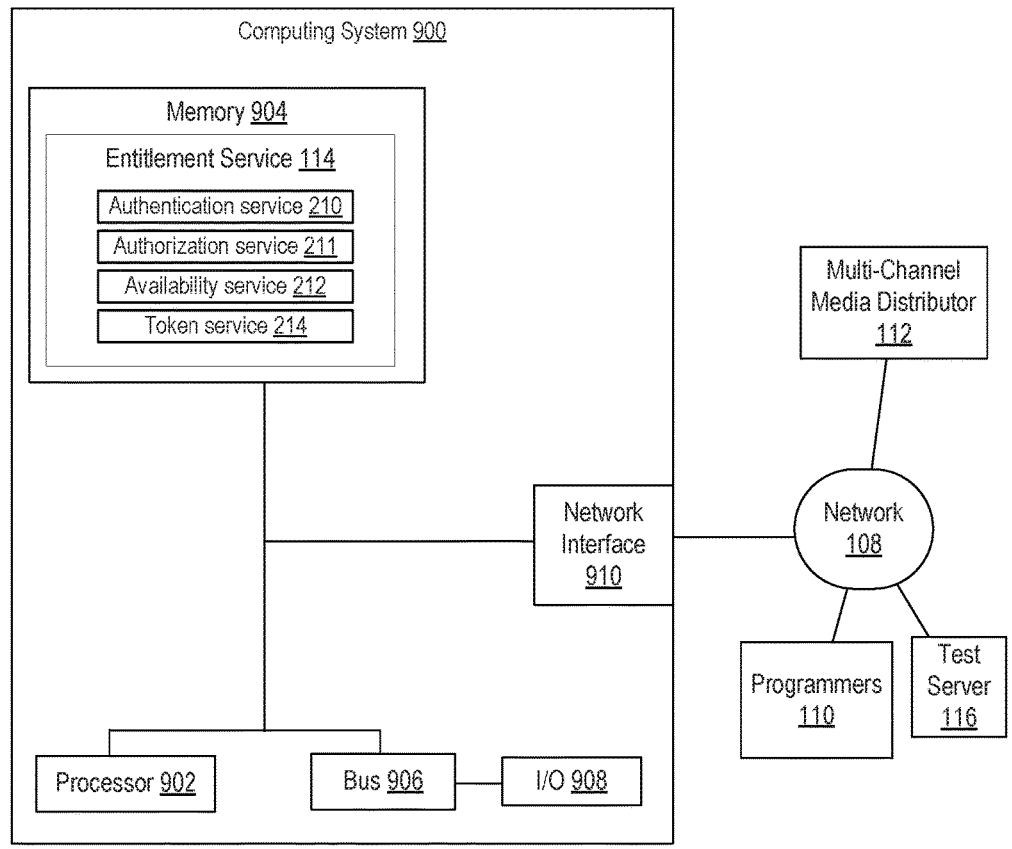
FIG. 9 is a block diagram depicting an example of a computing system used to implement certain embodiments.

In some embodiments, the entitlement service 114 executes one or more suitable algorithms for determining that the availability (e.g., the responsiveness) of the multi-channel media distributor for authentication or authorization has been restored. For example, FIG. 8 is a flow chart depicting an example of a process 800 for determining a restored availability of the multi-channel media distributor 112. In some embodiments, one or more processing devices implement operations depicted in FIG. 8 by executing suitable program code (e.g., the entitlement service 114 and the availability service 212). For illustrative purposes, the process 800 is described with reference to the examples depicted in FIGS. 1-7. Other implementations, however, are possible.

At block 802, the process 800 involves diverting first requests, which are used to cause programmers associated with a multi-channel media distributor to provide first media content to first user devices, from reaching the multi-channel media distributor. For example, at least one processing device executes the entitlement service 114 to divert the first requests. Diverting the requests involves, for example, determining that the requests are for the multi-channel media distributor 112 to authenticate user devices or verify that the user devices are authorized to access media content. The entitlement service 114 prevents these requests from being transmitted to the multi-channel media distributor 112, and responds to receiving the requests by providing the associated user devices with temporary access to media content from the programmers 110.

At block 804, the process 800 involves transmitting, subsequent to diverting at least some of the first requests, test requests from the entitlement service to the multi-channel media distributor. For example, at least one processing device executes the entitlement service 114 and thereby configures a suitable network interface device to transmit the test requests to the multi-channel media distributor 112. The test requests include one or more of test authentication credentials and test authorization credentials that are valid for the multi-channel media distributor.

In some embodiments, the entitlement service 114 causes a test service to generate and send the test requests. These test credentials are generated using the entitlement service 114 specifically for verifying the responsiveness of the multi-channel media distributor 112, and are not used by user devices 106.

In some embodiments, the test service is executed on a test server 116 that is accessible by the entitlement service 114 via a data network. The availability service 212 of the entitlement service 114 generates an instruction message for the test server 116 to generate and transmit the test requests to the entitlement service 114. The entitlement service 114 transmits the instruction message to the test server 116 via one or more data networks 108. In other embodiments, the test service is executed on a computing system that also executes the entitlement service 114. The availability service 212 of the entitlement service 114 instructs the test service to generate the test requests and provide the test requests to the entitlement service 114.

In additional or alternative embodiments, these test credentials are user credentials associated with one or more users 102, 104. For example, the entitlement service 114 receives user credentials with a first set of requests for access to media content. The entitlement service 114 provides temporary access to the media content, regardless of any authentication or authorization by the multi-channel media distributor 112, based on receiving the first set of requests. The entitlement service 114 also selects a subset of these requests as test requests. In some embodiments, this subset is selected based on the entitlement service 114 recently receiving successful authentication or authorization messages from the multi-channel media distributor 112 in response to submitting other requests with the same user credentials. For example, if a request includes credentials that successfully resulted in authentication or authorization when transmitted to the multi-channel media distributor 112 in the last day, the last hour, or some other threshold time period, the request may be included in the selected subset of test requests. In additional or alternative embodiments, the subset of requests is selected for inclusion in the test requests even if the entitlement service 114 lacks information about the validity of credentials included in the selected requests.

At block 806, the process 800 involves determining that the multi-channel media distributor has authenticated user credentials included in the test requests or has authorized content access based on the test requests. For example, at least one processing device executes the entitlement service 114 to determine whether transmitting the test requests to the multi-channel media distributor 112 results in receiving one or more messages from the multi-channel media distributor 112 indicating a successful authentication or authorization.

At block 808, the process 800 involves transmitting, from the entitlement service to the multi-channel media distributor, second requests for the programmers to provide second media content to second user devices. The second requests are transmitted based on determining that the multi-channel media distributor has authenticated the user credentials or has authorized the content access. For example, at least one processing device executes the entitlement service 114 and thereby configures a suitable network interface device to transmit the second requests to the multi-channel media distributor 112. The second requests are generated based from communications between the programmer 110 and the access enabler 202 that result from a user requesting access to media content.

In some embodiments involving test requests selected from live requests, the entitlement service 114 transmits the second requests to the multi-channel media distributor 112 if a sufficient number of the test requests result in successful authentication or authorization. For example, the entitlement service 114 can execute blocks 404, 406, 408, and 410 of the process 400 depicted in FIG. 4. If an output indicating normal availability is generated based on providing the test request to the multi-channel media distributor 112, the entitlement service 114 transmits subsequently received media content requests to the multi-channel media distributor 112. In other embodiments involving test requests with credentials known by the entitlement service 114 to be valid, the entitlement service 114 transmits the second requests to the multi-channel media distributor 112 if the test requests result in successful authentication or authorization.

In some embodiments, the second requests transmitted by the entitlement service 114 include fewer than all requests for access to media content that are received by the entitlement service 114. For example, subsequent to successful authentication or authorization resulting from test requests, the entitlement service 114 receives additional requests for authenticating users or providing content access for authenticated users. The entitlement service 114 transmits a first percentage of the requests to the multi-channel media distributor 112, and diverts any other requests (e.g., by continuing to provide temporary access to request media content). In some embodiments, the transmitted requests are copies of requests received by the entitlement service 114. The entitlement service 114 continues granting temporary access based on the request (i.e., without requiring the involvement of the multi-channel media distributor 112), and uses the copies of these requests to determine whether the availability of the multi-channel media distributor 112 has been restored.

If a threshold number of the first percentage of requests (or copies of the requests transmitted to the multi-channel media distributor 112) results in authentication or authorization, the entitlement service 114 transmits a second percentage of subsequent requests (or copies of the requests) to the multi-channel media distributor 112, where the second percentage is larger than the first percentage. If a threshold number of the second percentage of requests results in authentication or authorization, the entitlement service 114 transmits a third percentage of subsequent requests (or copies of the requests) to the multi-channel media distributor 112, where the third percentage is larger than the second percentage. In this manner, the entitlement service 114 iteratively decreases the number or percentage of requests being diverted and, if each iteration results in a sufficient number of authentications or authorizations, ceases iteration once all requests are being transmitted to the multi-channel media distributor 112. For embodiments in which copies of received requests are transmitted to the multi-channel media distributor 112, the entitlement service 114 ceases diverting requests (i.e., relies on the multi-channel media distributor 112 when providing content access) in response to a sufficient percentage of transmitted copies of requests resulting in successful authentication or authorization events.

Exemplary Computing Environment

Any suitable computing system or group of computing systems can be used for performing the operations described herein. For example, FIG. 10 is a block diagram depicting an example of a computing system 1000 that executes an entitlement service for determining an availability of a multi-channel media distributor 112.

The depicted example of the computing system 1000 includes one or more processors 1002 communicatively coupled to one or more memory devices 1004. The processor 1002 executes computer-executable program code, accesses information stored in the memory device 1004, or both. Examples of processor 1002 include a microprocessor, an application-specific integrated circuit ("ASIC"), a field-programmable gate array ("FPGA"), or other suitable processing device. The processor 1002 can include any number of processing devices, including one.

The memory device 1004 includes any suitable non-transitory computer-readable medium for storing the authentication service 210, the authorization service 211, the availability service 212, and the token service 214. The computer-readable medium can include any electronic, optical, magnetic, or other storage device capable of providing a processor with computer-readable instructions or other program code. Non-limiting examples of a computer-readable medium include a magnetic disk, a memory chip, a ROM, a RAM, an ASIC, optical storage, magnetic tape or other magnetic storage, or any other medium from which a processing device can read instructions. The instructions may include processor-specific instructions generated by a compiler or an interpreter from code written in any suitable computer-programming language, including, for example, C, C++, C#, Visual Basic, Java, Python, Perl, JavaScript, and ActionScript.

The computing system 1000 may also include a number of external or internal devices such as input or output devices. For example, the computing system 1000 is shown with an input/output ("I/O") interface 1008 that can receive input from input devices or provide output to output devices. A bus 1006 can also be included in the computing system 1000. The bus 1006 can communicatively couple one or more components of the computing system 1000.

The computing system 1000 executes program code that configures the processor 1002 to perform one or more of the operations described above with respect to FIGS. 1-9. The program code includes, for example, one or more of the authentication service 210, the authorization service 211, the availability service 212, the token service 214, or other suitable applications that perform one or more operations described herein. The program code may be resident in the memory device 1004 or any suitable computer-readable medium and may be executed by the processor 1002 or any other suitable processor. In some embodiments, the program code described above and data used for determining availability of the multi-channel media distributor 112 (e.g., test credentials, analytics data, etc.) are stored in the memory device 1004. In additional or alternative embodiments, one or more of the program code described above and data used for determining availability of the multi-channel media distributor 112 (e.g., test credentials, analytics data, etc.) are stored in one or more memory devices accessible via a data network 108, such as a memory device accessible via a cloud service.

The computing system 1000 depicted in FIG. 10 also includes at least one network interface 1010. The network interface 1010 includes any device or group of devices suitable for establishing a wired or wireless data connection to one or more data networks 108. Non-limiting examples of the network interface 1010 include an Ethernet network adapter, a modem, and other suitable transceivers. The computing system 1000 is able to communicate with one or more online programmers 110, one or more multi-channel media distributors 112, and (in some embodiments) one or more test servers 116 using the network interface 1010.

General Considerations

Numerous specific details are set forth herein to provide a thorough understanding of the claimed subject matter. However, those skilled in the art will understand that the claimed subject matter may be practiced without these specific details. In other instances, methods, apparatuses, or systems that would be known by one of ordinary skill have not been described in detail so as not to obscure claimed subject matter.

Unless specifically stated otherwise, it is appreciated that throughout this specification discussions utilizing terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provides a result conditioned on one or more inputs. Suitable computing devices include multipurpose microprocessor-based computer systems accessing stored software that programs or configures the computing system from a general purpose computing apparatus to a specialized computing apparatus implementing one or more embodiments of the present subject matter. Any suitable programming, scripting, or other type of language or combinations of languages may be used to implement the teachings contained herein in software to be used in programming or configuring a computing device.

Embodiments of the methods disclosed herein may be performed in the operation of such computing devices. The order of the blocks presented in the examples above can be varied—for example, blocks can be re-ordered, combined, and/or broken into sub-blocks. Certain blocks or processes can be performed in parallel.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Headings, lists, and numbering included herein are for ease of explanation only and are not meant to be limiting.

While the present subject matter has been described in detail with respect to specific embodiments thereof, it will be appreciated that those skilled in the art, upon attaining an understanding of the foregoing, may readily produce alterations to, variations of, and equivalents to such embodiments. Accordingly, it should be understood that the present disclosure has been presented for purposes of example rather than limitation, and does not preclude inclusion of such modifications, variations, and/or additions to the present subject matter as would be readily apparent to one of ordinary skill in the art.

What is claimed is:

1. A method comprising:
   receiving, by an entitlement service executed by a processing device, requests for programmers to provide media content to user devices;
   transmitting, by the entitlement service, the requests to a multi-channel media distributor, wherein the entitlement service accesses the multi-channel media distributor to authenticate users requesting content from the programmers or to confirm that authenticated users are authorized to receive content from the programmers;
   determining, by the entitlement service and based on the transmitted requests, a success rate indicating whether the multi-channel media distributor has failed to authenticate user credentials included in the requests or has failed to authorize content access based on the requests;
   identifying, by the entitlement service and based on the success rate, a reduced availability of the multi-channel media distributor; and
   providing, by the entitlement service, the user devices with temporary access to the media content from the programmers during a period in which the reduced availability occurs.

2. The method of claim 1, wherein the requests are received via a data network from computing devices associated with the programmers, wherein determining the success rate comprises determining that the multi-channel media distributor has failed to authenticate users or authorize content access for a percentage of the requests, wherein identifying the reduced availability comprises determining that the percentage of the requests is less than a threshold percentage.

3. The method of claim 2, wherein determining that the percentage of the requests is less than the threshold percentage comprises:

accessing historical data indicating previous requests for the programmers to provide access to content;

identifying, from the historical data, a number of the previous requests that resulted in the multi-channel media distributor authenticating users or authorizing content access; and calculating the threshold percentage based on the number of the previous requests that resulted in the multi-channel media distributor authenticating users or authorizing content access.

4. The method of claim 2, wherein the percentage of the requests is determined for a specific one of the programmers for which the multi-channel media distributor provides authentication or authorization verification.

5. The method of claim 2, wherein the percentage of the requests is determined for multiple programmers for which the multi-channel media distributor provides authentication or authorization verification.

6. The method of claim 1, wherein the method further comprises causing, prior to receiving the requests, a test server to transmit the requests via a data network to the entitlement service, wherein the requests include test authentication credentials or test authorization credentials that are valid for the multi-channel media distributor, wherein identifying the reduced availability comprises determining that the multi-channel media distributor has failed to authenticate the test authentication credentials or authorize content access based on the test authorization credentials.

7. The method of claim 1, wherein the requests comprise live requests received via a data network from computing devices associated with the programmers and test requests received via the data network from a test server, wherein the entitlement service causes the test server to transmit the test requests based on determining that the multi-channel media distributor has failed to authenticate users or authorize content access for a percentage of the live requests that is less than a threshold percentage, wherein identifying the reduced availability comprises determining that the multi-channel media distributor has failed to authenticate test authentication credentials included in at least some of the test requests or authorize content access based on test authorization credentials included in at least some of the test requests.

8. A system comprising:

a processing device;

a network interface device communicatively coupled to the processing device and configured for receiving requests for programmers to provide media content to user devices; and a non-transitory computer-readable medium storing program code that comprises an entitlement service, wherein the processing device is configured for executing the stored program code and thereby performing operations comprising:

configuring the network device to transmit the requests to a multi-channel media distributor used to authenticate users requesting content from the programmers or to confirm that authenticated users are authorized to receive content from the programmers;

determining, based on the transmitted requests, a success rate indicating whether the multi-channel media distributor has failed to authenticate user credentials included in the requests or has failed to authorize content access based on the requests;

identifying, based on the success rate, a reduced availability of the multi-channel media distributor; and configuring the network device to transmit messages providing the user devices with temporary access to the media content from the programmers during a period in which the reduced availability occurs.

9. The system of claim 8, wherein the network interface device is configured for receiving the requests via a data network from computing devices associated with the programmers, wherein determining the success rate comprises determining that the multi-channel media distributor has failed to authenticate users or authorize content access for a percentage of the requests, wherein identifying the reduced availability comprises determining that the percentage of the requests is less than a threshold percentage.

10. The system of claim 9, wherein determining that the percentage of the requests is less than the threshold percentage comprises:

accessing historical data indicating previous requests for the programmers to provide access to content;

identifying, from the historical data, a number of the previous requests that resulted in the multi-channel media distributor authenticating users or authorizing content access; and calculating the threshold percentage based on the number of the previous requests that resulted in the multi-channel media distributor authenticating users or authorizing content access.

11. The system of claim 9, wherein the processing device is configured for determining the percentage of the requests for a specific one of the programmers for which the multi-channel media distributor provides authentication or authorization verification.

12. The system of claim 9, wherein the processing device is configured for determining the percentage of the requests for multiple programmers for which the multi-channel media distributor provides authentication or authorization verification.

13. The system of claim 8, wherein the operations further comprise causing, prior to receiving the requests, a test server to transmit the requests via a data network to the entitlement service, wherein the requests include test authentication credentials or test authorization credentials that are valid for the multi-channel media distributor, wherein identifying the reduced availability comprises determining that the multi-channel media distributor has failed to authenticate the test authentication credentials or authorize content access based on the test authorization credentials.

14. The system of claim 8, wherein the requests comprise live requests received via a data network from computing devices associated with the programmers and test requests received via the data network from a test server, wherein the processing device is configured for causing the test server to transmit the test requests based on determining that the multi-channel media distributor has failed to authenticate users or authorize content access for a percentage of the live requests that is less than a threshold percentage, wherein identifying the reduced availability comprises determining that the multi-channel media distributor has failed to authenticate test authentication credentials included in at least some of the test requests or authorize content access based on test authorization credentials included in at least some of the test requests.

15. A non-transitory computer-readable medium having program code executable by a processing device stored thereon, the program code comprising:

program code for receiving requests for programmers to provide media content to user devices;

program code for transmitting the requests to a multi-channel media distributor, wherein the multi-channel media distributor is used to authenticate users requesting content from the programmers or to confirm that authenticated users are authorized to receive content from the programmers;

program code for determining, based on the transmitted requests, a success rate indicating whether the multi-channel media distributor has failed to authenticate user credentials included in the requests or has failed to authorize content access based on the requests;

program code for identifying, based on the success rate, a reduced availability of the multi-channel media distributor; and program code for providing the user devices with temporary access to the media content from the programmers during a period in which the reduced availability occurs.

16. The non-transitory computer-readable medium of claim 15, wherein determining the success rate comprises determining that the multi-channel media distributor has failed to authenticate users or authorize content access for a percentage of the requests, wherein identifying the reduced availability comprises determining that the percentage of the requests is less than a threshold percentage.

17. The non-transitory computer-readable medium of claim 16, wherein determining that the percentage of the requests is less than the threshold percentage comprises:

accessing historical data indicating previous requests for the programmers to provide access to content;

identifying, from the historical data, a number of the previous requests that resulted in the multi-channel media distributor authenticating users or authorizing content access; and calculating the threshold percentage based on the number of the previous requests that resulted in the multi-channel media distributor authenticating users or authorizing content access.

18. The non-transitory computer-readable medium of claim 16, wherein the percentage of the requests is determined for at least one of:

a specific one of the programmers for which the multi-channel media distributor provides authentication or authorization verification; or multiple programmers for which the multi-channel media distributor provides authentication or authorization verification.

19. The non-transitory computer-readable medium of claim 15, wherein the program code further comprises program code for causing, prior to receiving the requests, a test server to transmit the requests via a data network to the entitlement service, wherein the requests include test authentication credentials or test authorization credentials that are valid for the multi-channel media distributor, wherein identifying the reduced availability comprises determining that the multi-channel media distributor has failed to authenticate the test authentication credentials or authorize content access based on the test authorization credentials.

20. The non-transitory computer-readable medium of claim 15, wherein the requests comprise live requests received via a data network from computing devices associated with the programmers and test requests received via the data network from a test server, wherein the program code further comprises program code for causing the test server to transmit the test requests based on determining that the multi-channel media distributor has failed to authenticate users or authorize content access for a percentage of the live requests that is less than a threshold percentage, wherein identifying the reduced availability comprises determining that the multi-channel media distributor has failed to authenticate test authentication credentials included in at least some of the test requests or authorize content access based on test authorization credentials included in at least some of the test requests.

\* \* \* \* \*